(12) United States Patent
Sumitomo (10) Patent No.: US 9,417,424 B2
(45) Date of Patent: Aug. 16, 2016

(54) VIBRATION ACTUATOR, LENS BARREL, AND CAMERA

(75) Inventor: Mine Sumitomo, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 1039 days.

(21) Appl. No.: 13/523,110

(22) Filed: Jun. 14, 2012

(65) Prior Publication Data

US 2012/0325031 A1   Dec. 27, 2012

(30) Foreign Application Priority Data

Jun. 22, 2011   (JP) .................................. 2011-138368

(51) Int. Cl.
| | |
|---|---|
| G02B 7/04 | (2006.01) |
| G02B 7/02 | (2006.01) |
| H02N 2/00 | (2006.01) |
| H02N 2/16 | (2006.01) |

(52) U.S. Cl.
CPC ................ *G02B 7/028* (2013.01); *H02N 2/007* (2013.01); *H02N 2/163* (2013.01); *Y10T 74/18056* (2015.01)

(58) Field of Classification Search
CPC ....... H02N 2/103; H02N 2/026; H02N 2/163; H02N 2/007
USPC ........................................ 310/323.02, 323.11
See application file for complete search history.

(56) References Cited

U.S. PATENT DOCUMENTS

| | | | | |
|---|---|---|---|---|
| 2005/0127782 A1* | 6/2005 | Endo | ........................ | G04C 3/12 310/323.02 |
| 2005/0134145 A1* | 6/2005 | Miyazaki | ............... | H02N 2/007 310/323.11 |
| 2006/0267454 A1* | 11/2006 | Ashizawa | .............. | H02N 2/163 310/323.02 |
| 2011/0292528 A1* | 12/2011 | Kariya | ................... | H02N 2/163 359/824 |

FOREIGN PATENT DOCUMENTS

| | | |
|---|---|---|
| JP | A-61-227682 | 10/1986 |
| JP | A-64-19981 | 1/1989 |
| JP | A-2-261074 | 10/1990 |
| JP | A-3-273877 | 12/1991 |
| JP | A-4-33578 | 2/1992 |
| JP | A-2005-124382 | 5/2005 |

OTHER PUBLICATIONS

May 7, 2013 Japanese Office Action issued in Japanese Patent Application No. 2011-138368 (with translation).
Sep. 6, 2015 Office Action issued in Chinese Application No. 201210230139.6.

* cited by examiner

*Primary Examiner* — Shawki S Ismail
*Assistant Examiner* — Bryan Gordon
(74) *Attorney, Agent, or Firm* — Oliff PLC (57) ABSTRACT

A vibration actuator includes an elastic member and a relative movement member. The elastic member generates oscillatory waves by oscillation of an electromechanical conversion element. The relative movement member with which the elastic member is in pressure contact is driven by the oscillatory waves to rotationally move with respect to the elastic member. Of the elastic member and the relative movement member, at least one member has a plurality of spaces at one contacting face opposite to the other contacting face of the other member. The spaces are filled with friction coefficient adjusting substances so that a coefficient of friction of the one contacting face of the one member changes in a radial direction.

11 Claims, 5 Drawing Sheets

VIBRATION ACTUATOR, LENS BARREL, AND CAMERA

This application is based on and claims the benefit of priority from Japanese Patent Application No. 2011-138368, filed on 22 Jun. 2011, the content of which is incorporated herein by reference.

BACKGROUND OF THE INVENTION

1. Field of the Invention

The present invention relates to a vibration actuator, a lens barrel and a camera.

2. Related Art

A vibration actuator includes an elastic member and a relative movement member. The elastic member generates oscillatory waves by oscillation of an electromechanical conversion element. The relative movement member with which the elastic member is in pressure contact is driven by the oscillatory waves to rotationally move with respect to the elastic member. A vibration actuator has been conventionally known in which a porous plastic material is used for a contacting surface of an elastic member or a relative movement member. Pores of the porous plastic material are filled with a lubricant for improved lubricating ability (for example, Japanese Patent Application No. S62-173227).

However, contact points at the contacting surface between the elastic member and the relative movement member differ depending on ambient temperature. More specifically, at a low temperature, the elastic member contracts and deforms such that an inner peripheral side of the elastic member departs away from and an outer peripheral side approaches a driven face of the relative movement member. On the other hand, at a high temperature, the elastic member expands and deforms such that the inner peripheral side of the elastic member approaches and the outer peripheral side departs away from the driven face of the relative movement member. As a result, even if the lubrication performance of the vibration actuator is improved by the pores filled with the lubricant, there is a problem of variation in the driving performance depending on the ambient temperature at which the vibration actuator is used.

SUMMARY OF THE INVENTION

The present invention provides a vibration actuator that corrects the variation in the driving performance depending on the ambient temperature.

The present invention solves the problem described above with the solution described below. Herein, for simplicity of description, descriptions are given with reference symbols corresponding to embodiments of the present invention, but these are not limiting.

In a first aspect of the present invention, a vibration actuator (10) is provided, which includes an elastic member (12) and a relative movement member (15). The elastic member (12) generates oscillatory waves by oscillation of an electromechanical conversion element (13). The relative movement member (15) with which the elastic member (12) is in pressure contact is driven by the oscillatory waves to rotationally move with respect to the elastic member (12). Of the elastic member (12) and the relative movement member (15), at least one member has a plurality of spaces (15D) at one contacting face opposite to the other contacting face of the other member. The spaces (15D) are filled with friction coefficient adjusting substances (15E) so that a coefficient of friction of the one contacting face of the one member changes in a radial direction.

In a second aspect of the present invention, the vibration actuator (10) according to the first aspect is provided, in which the friction coefficient adjusting substances (15E) differ in degrees of changing the coefficient of friction and are configured to fill in the spaces (15D) according to positions in the radial direction so as to adjust the coefficient of friction.

In a third aspect of the present invention, the vibration actuator (10) according to the second aspect is provided, in which the more outward a space (15D) is located in the radial direction, a coefficient of friction adjusting substance (15E) having the higher degree of changing the coefficient of friction is filled in the space (15D).

In a fourth aspect of the present invention, the vibration actuator (10) according to the second aspect, in which the more inward a space (15D) is located in the radial direction, a coefficient of friction adjusting substance (15E) having the higher degree of changing the coefficient of friction is filled in the space (15D).

In a fifth aspect of the present invention, the vibration actuator (10) according to the first aspect is provided, in which proportions of the spaces (15D) differ from each other depending on positions in the radial direction.

In a sixth aspect of the present invention, the vibration actuator (10) according to the fifth aspect, in which the more outward a space (15D) is located in the radial direction, the greater a proportion of the space (15D) is.

In a seventh aspect of the present invention, the vibration actuator (10) according to the fifth aspect, in which the more inward a space (15D) is located in the radial direction, the greater a proportion of the space (15D) is.

In an eighth aspect of the present invention, a lens barrel (3) is provided, which includes the vibration actuator (10) of any one of the first to seventh aspects.

In a ninth aspect of the present invention, a camera (1) is provided, which includes the vibration actuator (10) of any one of the first to seventh aspects.

It should be noted that the configurations described above with reference symbols may be suitably modified and at least portions thereof may be replaced with other constituents.

According to the present invention, the vibration actuator is provided, which corrects the variation in the driving performance depending on the ambient temperature.

DETAILED DESCRIPTION OF THE INVENTION

An embodiment of the present invention is described hereinafter with reference to the drawings. In the drawings shown below, an XYZ orthogonal coordinate system is provided for the sake of easy description and understanding. In this coordinate system, an X+ direction is defined as a direction pointing to the left when a photographer sees while the photographer positions a camera so that an optical axis OA is horizontal (hereinafter referred to as a normal position) to take a long sideway picture. A direction pointing upward at the normal position is defined as a Y+ direction. In addition, a direction pointing to an object at the normal position is defined as a Z+ direction.

Figure 1:
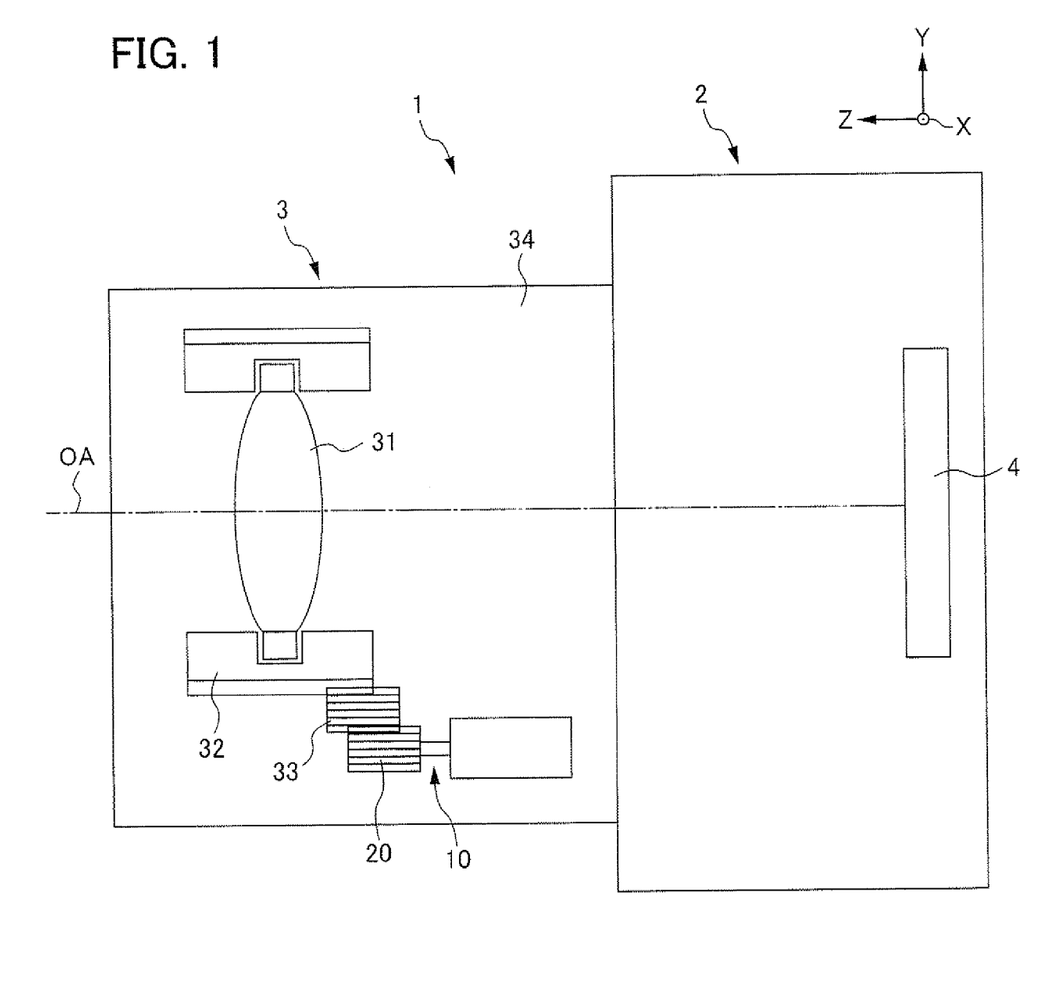
FIG. 1 is a schematic diagram of a camera according to the present embodiment.
Figure 2:
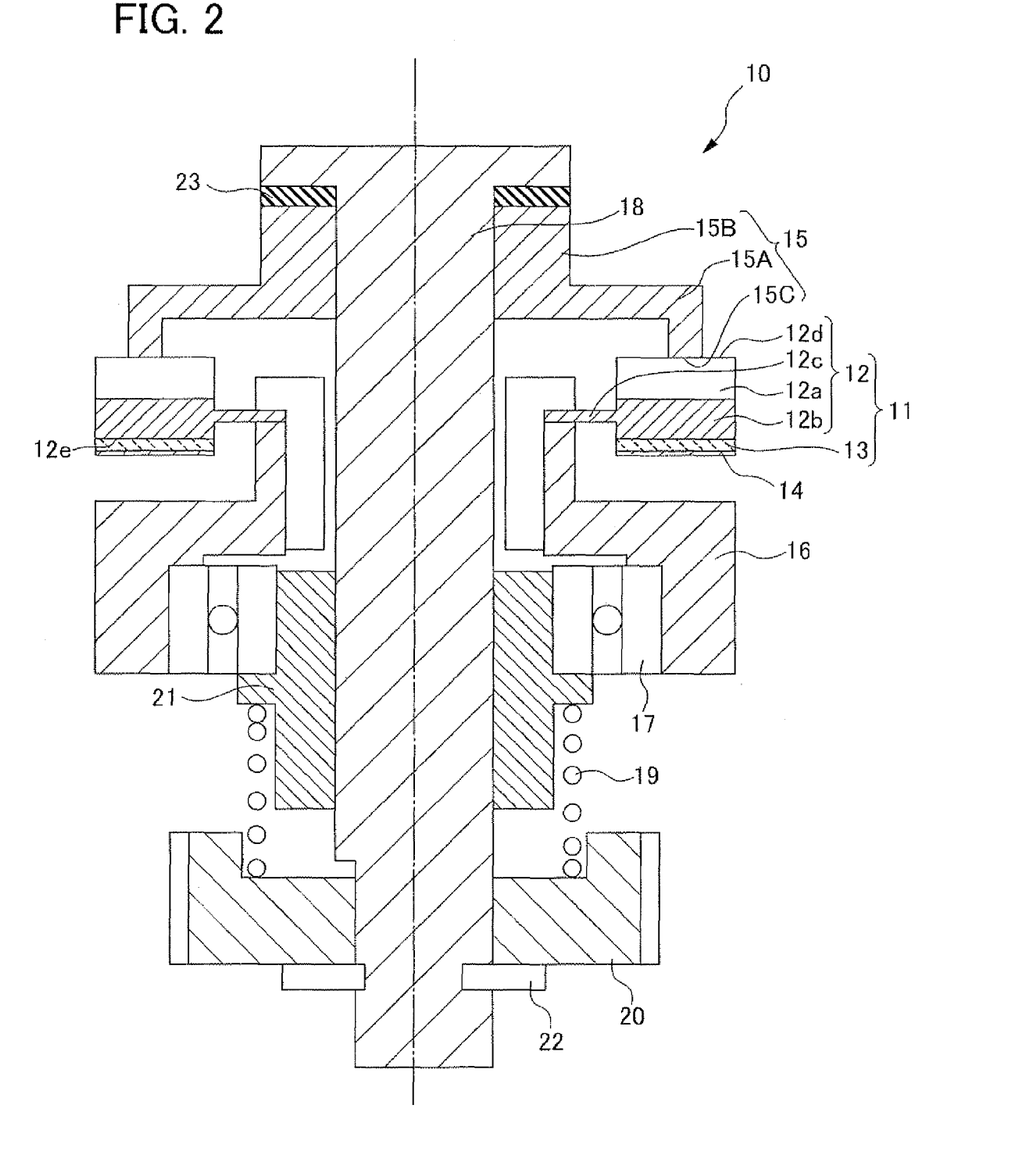
FIG. 2 is a vertical cross-sectional view of an ultrasonic motor.

FIG. 1 is a schematic diagram of a camera 1 according to the present embodiment. FIG. 2 is a vertical cross-sectional view of an ultrasonic motor 10.

The camera 1 according to the present embodiment includes a camera body 2 with an imaging device 4 and a lens barrel 3 with a lens 31.

The lens barrel 3 is an interchangeable lens that is mountable to and detachable from the camera body 2. It should be noted that although the lens barrel 3 is an interchangeable lens in the present embodiment, the present invention is not limited thereto and the lens barrel 3 may alternatively be configured integrally with the camera body.

The lens barrel 3 is provided with the lens 31, a cam tube 32, an idle gear 33, an ultrasonic motor 10, a fixed outer barrel 34 that surrounds these components, and the like.

In the present embodiment, the ultrasonic motor 10 is disposed in an annular gap between the cam tube 32 and the fixed outer barrel 34. The ultrasonic motor 10 is a driving source to drive the lens 31 of the camera 1. The ultrasonic motor 10 rotationally drives the cam tube 32 via the idle gear 33 with which an output gear 20 engages.

The cam tube 32 is provided inside the fixed outer barrel 34 so that the cam tube 32 is movable in parallel with the optical axis OA (in a Z axis direction) by rotation of the ultrasonic motor 10.

The lens 31 is supported by the cam tube 32. The cam tube 32, which the ultrasonic motor 10 drives to move, causes the lens 31 to move in a direction of the optical axis OA.

Although not illustrated, the lens barrel 3 includes a plurality of lenses in addition to the lens 31.

In FIG. 1, the plurality of lenses including the lens 31 provided inside the lens barrel 3 forms an object image on an imaging surface of the imaging device 4. The imaging device 4 converts the object image thus formed into an electric signal, which is A/D converted to obtain image data.

Next, the ultrasonic motor 10, of which vertical cross-sectional view is shown in FIG. 2, is described.

The ultrasonic motor 10 includes an oscillator 11, a movement member 15, an output shaft 18, a pressing member 19 and the like. The oscillator 11 is fixed and causes the movement member 15 to be rotationally driven.

The oscillator 11 is a substantially annular shaped member having an elastic body 12 to which a piezoelectric body 13 is joined.

The elastic body 12 is composed of a metallic material having high resonance sharpness and has a substantially annular shape. The elastic body 12 has a comb portion 12a, a base portion 12b, and a flange portion 12c.

The comb portion 12a includes a plurality of grooves on a surface opposite to a surface to which the piezoelectric body 13 is joined. An end face of the comb portion 12a with which the movement member 15 is in pressure contact functions as a driving surface 12d to drive the movement member 15. The driving surface 12d is treated by a lubricant surface treatment, such as Ni—P (nickel-phosphorous) plating. The comb portion 12a enables a neutral plane of a progressive wave generated by expansion and contraction of the piezoelectric body 13 on the driving surface to be close to the piezoelectric body 13 as much as possible. Accordingly, it is possible to increase amplitude of the progressive wave on the driving surface.

The base portion 12b is continuous in a peripheral direction of the elastic body 12. The piezoelectric body 13 is joined to a surface of the base portion 12b opposite to the comb portion 12a (a joint surface 12e on an elastic body side).

The flange portion 12c is like a brim that projects radially inward with respect to the elastic body 12 and is disposed at a center in a thickness direction of the base portion 12b. The oscillator 11 is secured to a fixing member 16 via the flange portion 12c.

The piezoelectric body 13 is an electromechanical conversion element that converts electric energy to mechanical energy. Although a piezoelectric element is used as the piezoelectric body 13, an electrostrictive element may be alternatively used.

The piezoelectric body 13 is a substantially annular member and is divided along a peripheral direction of the elastic body 12 into two regions to which electric signals of two phases (A-phase and B-phase) are respectively input. In each phase, elements of opposite polarities are arranged alternately every half wavelength, such that an interval of quarter wavelength is present between A-phase and B-phase.

The piezoelectric body 13 is joined with the elastic body 12 by soldering.

Wiring of a flexible printed board 14 is connected to electrodes of respective phases of the piezoelectric body 13. A driving signal is supplied to the flexible printed board 14 from an amplifier (not illustrated). The driving signal triggers the piezoelectric body 13 to expand and contract.

In the oscillator 11, progressive waves, for example four, are generated on the driving surface 12d of the elastic body 12 by expansion and contraction of the piezoelectric body 13.

The movement member 15 is rotationally driven by the progressive waves generated on the driving surface 12d of the elastic body 12. The movement member 15 has a driven surface 15c that is in contact with the oscillator 11 (the driving surface 12d of the elastic body 12).

The movement member 15 is formed with light metal such as an aluminum alloy, plastic, or the like, for example. In a case in which the movement member 15 is formed with an aluminum alloy, a surface of the driven surface 15c is treated by anodization or the like for improving abrasion resistance.

The output shaft 18 is a substantially cylindrical member. A first end of the output shaft 18 is in contact with the movement member 15 via a rubber member 23 such that the output shaft 18 rotates along with the movement member 15.

The rubber member 23 is a substantially annular member that is made of rubber. The rubber member 23 has a function of not only making the movement member 15 and the output shaft 18 rotate together by viscoelasticity, but also absorbing the vibration of the movement member 15 to prevent it from being transmitted to the output shaft 18. Butyl rubber, silicone rubber, propylene rubber or the like is used for the rubber member 23.

The pressing member 19 generates a pressure force to cause the oscillator 11 and the movement member 15 to be in pressure contact with each other. The pressing member 19 is provided between the output gear 20 and a bearing receiving member 21. In the present embodiment, a helical compression spring is used as the pressing member 19; however, the present invention is not limited thereto.

The output gear 20 is inserted to fit into a D-cut of the output shaft 18 and fixed by a stopper 22 such as an E-ring, so that the output gear 20 is secured to the output shaft 18 in rotational and axial directions. The output gear 20, which engages with the idle gear 33 (see FIG. 1), rotates along with rotation of the output shaft 18, thereby transmitting (outputting) a rotational force to the idle gear 33.

The bearing receiving member 21 is arranged radially inward with respect to a bearing 17, which is arranged radially inward with respect to the fixing member 16.

The pressing member 19 applies pressure to the oscillator 11 to bias it toward the movement member 15 in an axial direction of the output shaft 18. Accordingly, the movement member 15 comes into pressure contact with the driving surface of the oscillator 11, so that the movement member 15 is rotationally driven. A pressure force adjusting washer may be provided between the pressing member 19 and the bearing receiving member 21 so as to obtain an appropriate pressure force for driving the ultrasonic motor 10.

In the ultrasonic motor 10 thus configured, the piezoelectric body 13 expands and contracts according to a driving signal supplied via the flexible printed board 14. The expansion and contraction of the piezoelectric body 13 generates progressive waves on the driving surface 12d of the elastic body 12. These progressive waves rotationally drive the movement member 15. Rotation of the movement member 15 is transmitted to the output shaft 18 via the rubber member 23. Accordingly, the output gear 20 that is fixed to the output shaft 18 rotates. As a result, a rotational force is output to the idle gear 33 (see FIG. 1) with which the output gear 20 engages.

Figure 3:
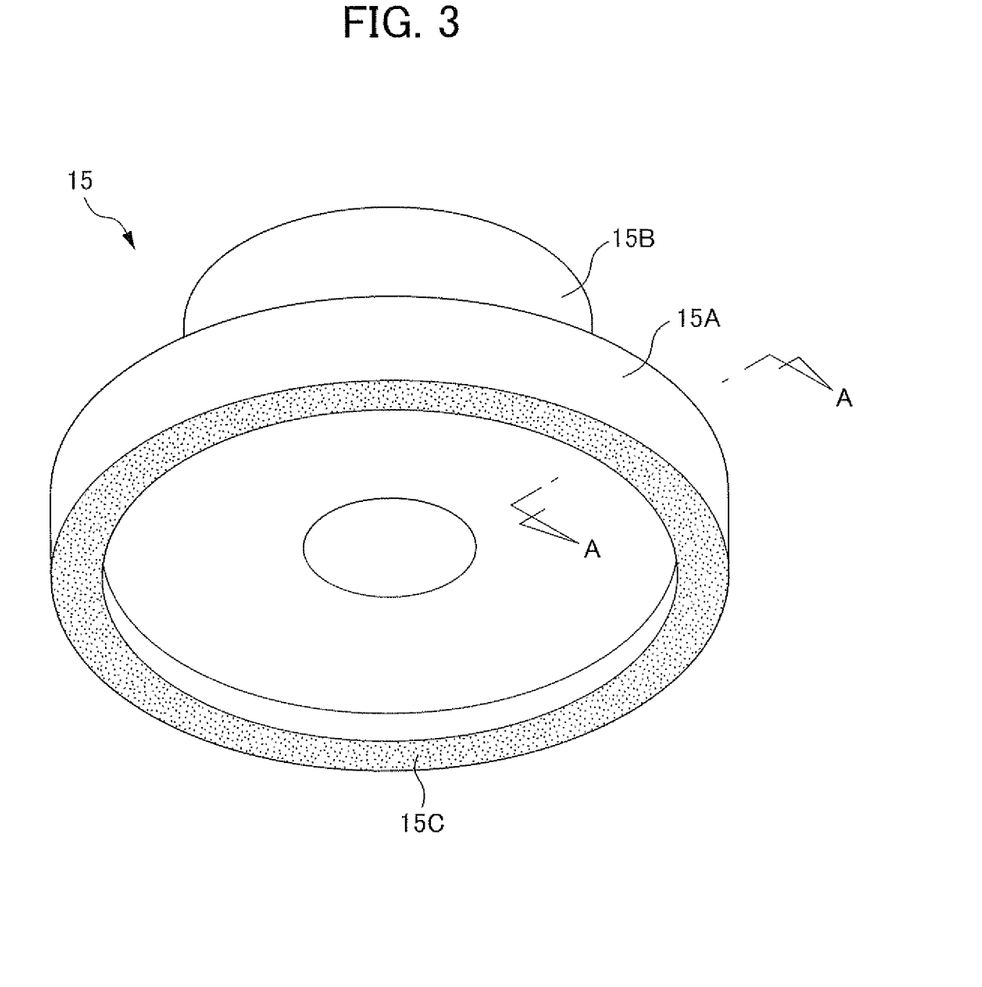
FIG. 3 is a perspective view of a movement member.
Figure 4A:
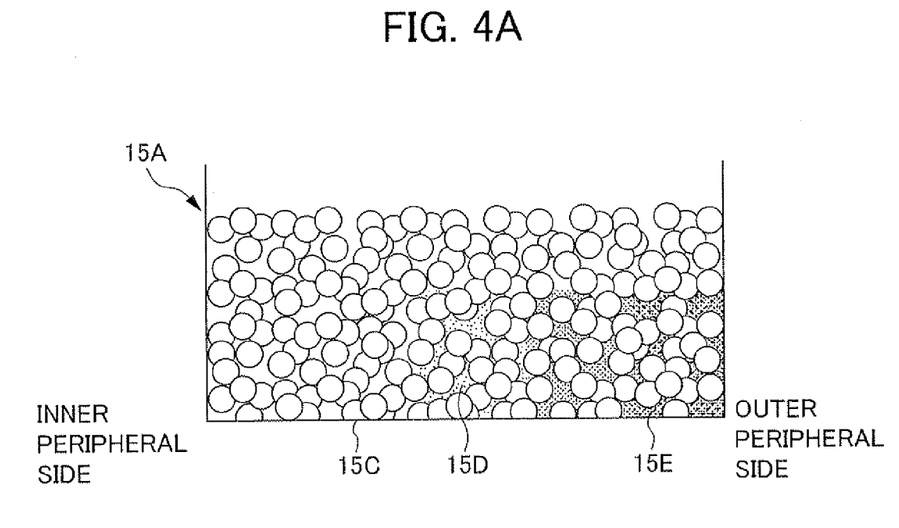
FIGS. 4A and 4B are enlarged schematic views each showing a cross-section of a driven face of the movement member taken along an A-A line in FIG. 3.
Figure 4B:
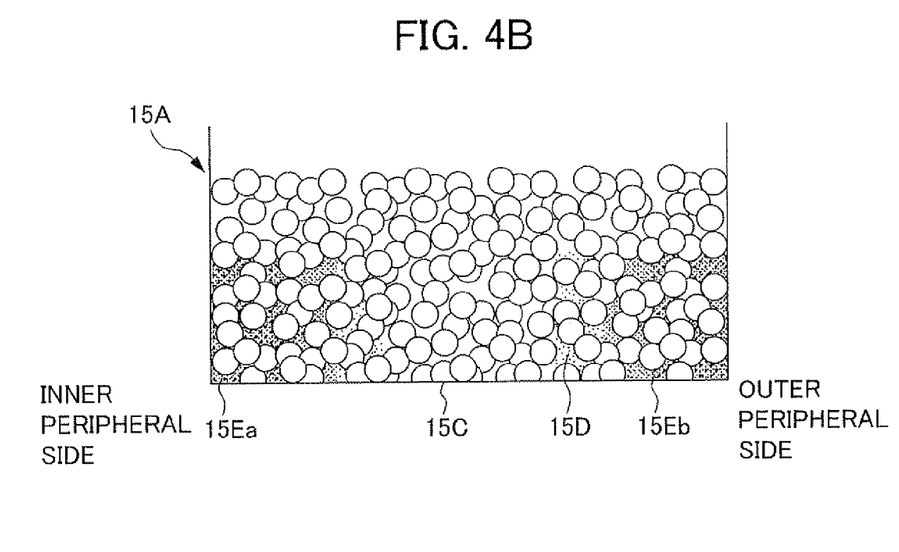

Next, the movement member 15 according to the embodiment of the present invention is described with reference to FIGS. 3 to 5 in addition to FIG. 2 described above. FIG. 3 is a perspective view of the movement member 15. FIGS. 4A and 4B are enlarged schematic views each showing a cross-section of a driven face of the movement member 15 taken along an A-A line in FIG. 3.

Figure 5A:
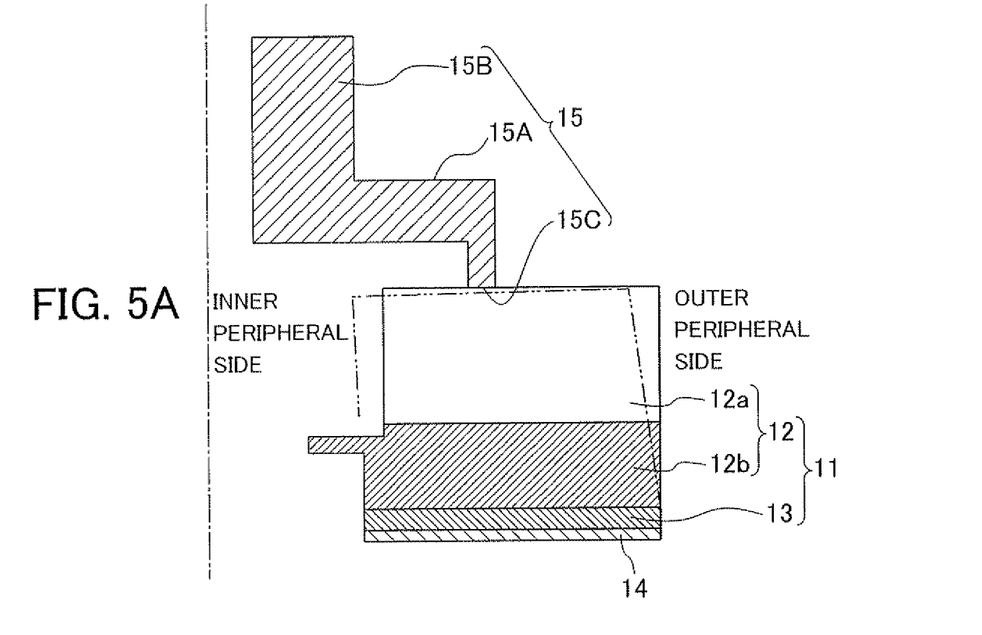
FIGS. 5A and 5B are diagrams each illustrating deformation due to temperature change of an oscillator in the ultrasonic motor.
Figure 5B:
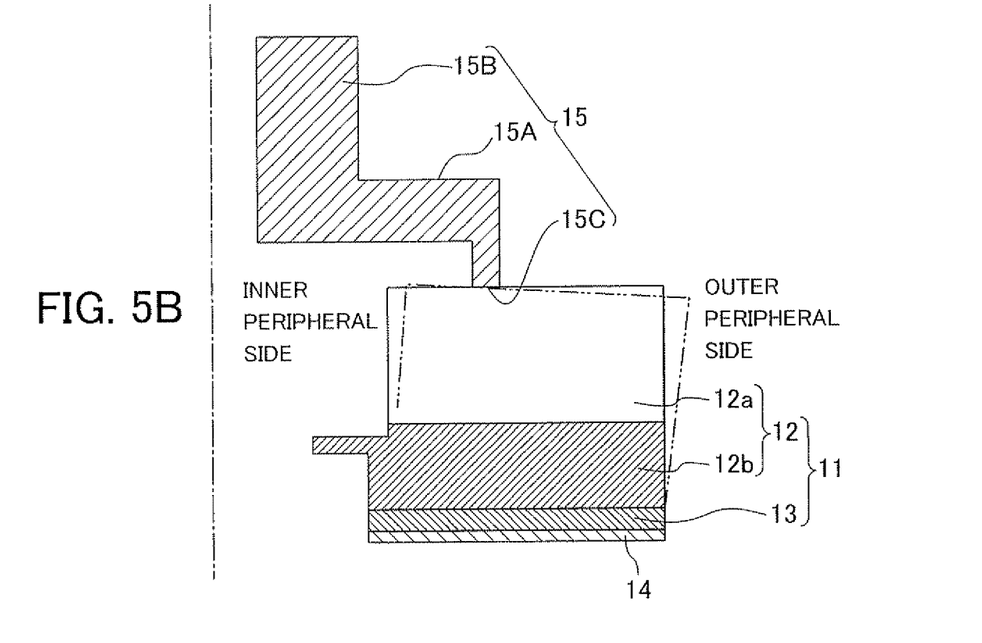

FIGS. 5A and 5B are diagrams each illustrating deformation due to temperature change of the oscillator 11 in the ultrasonic motor 10.

The movement member 15 is provided with a boss 15B, through which the output shaft 18 is inserted, in a center of a disk portion 15A of a predetermined diameter.

The driven surface 15C of a predetermined width is formed peripherally on a face of the disk portion 15A facing the driving surface 12d of the elastic body 12. As described above, the driven surface 15C is in contact with the driving surface 12d of the elastic body 12 in the oscillator 11, and is driven to move by the driving surface 12d.

As shown in FIG. 4, the driven surface 150 of the movement member 15 is formed to be porous with pores 15D. The pores 15D may be either an inevitable by-product obtained in a process for forming a sintered alloy and the like, or an intended product formed for reduction in weight and the like.

For example, in a case of anodization of a surface of an aluminum material, a number of micropores are formed at a surface of an anodized film.

As described above, the oscillator 11 in the ultrasonic motor 10 is composed of the elastic body 12 formed with an aluminum alloy to which the piezoelectric body 13 formed with ceramics is joined. Since a linear expansion coefficient of the aluminum alloy is greater than that of the ceramics, a deformation occurs at the oscillator 11 due to temperature change. More specifically, the piezoelectric body 13 restricts deformation of the elastic body 12, which has a greater linear expansion coefficient, at one face thereof. Accordingly, the elastic body 12 is obliquely deformed, so that the driving surface 12d that should be parallel to the driven surface 15C of the movement member 15 declines.

In FIG. 5A, a two-dot chain line shows a deformation when the temperature has dropped. In this case, since the elastic body 12 contracts, a deformation of the elastic body 12 occurs such that an inner peripheral side of the elastic body 12 separates from and an outer peripheral side thereof approaches the driven surface 15C of the movement member 15. In FIG. 5B, a two-dot chain line shows a deformation when the temperature has risen. In this case, since the elastic body 12 expands, deformation of the elastic body 12 occurs such that the inner peripheral side approaches and the outer peripheral side separates from the driven surface 150 of the movement member 15. As a result, there will be a change in a contact condition between the driving surface 12d of the elastic body 12 and the driven surface 15C of the movement member 15.

In other words, the ultrasonic motor 10 has features: When the temperature has dropped, the elastic body 12 is excessively in contact with the outer peripheral side of the movement member 15. When the temperature has risen, the elastic body 12 is excessively in contact with the inner peripheral side of the movement member 15. Such an excessive contact increases the driving resistance and prevents smooth driving, leading to a reduced driving force. The ultrasonic motor 10 is subject to such an effect especially under low temperature conditions.

In the present embodiment, the pores 15D at the driven surface 15C are impregnated with fillers 15E, 15Ea and 15Eb, as shown in FIGS. 4A and 4B. In other words, the driven surface 15C is formed at a predetermined precision, and the pores 15D at the driven surface 15C are filled with the fillers 15E, 15Ea and 15Eb by impregnating.

FIG. 4A is an example in which only a region on the outer peripheral side of the driven surface 15C of the movement member 15 is impregnated with the filler 15E with a low coefficient of friction and high lubricating ability. Such an example is realized by, for example, a step of impregnating the filler 15E while a region on the inner peripheral side of the driven surface 15C is masked.

FIG. 4B is an example in which the outer peripheral side and the inner peripheral side of the driven surface 15C of the movement member 15 are impregnated with fillers 15Ea and 15Eb of different coefficients of friction respectively. For example, the inner peripheral side of the driven surface 15C is impregnated with the filler 15Ea with a high coefficient of friction. In addition, a predetermined region on the outer peripheral side of the driven surface 15C is impregnated with the filler 15Eb with a low coefficient of friction and high lubricating ability.

In the above two examples, the inner peripheral side of the driven surface 15C has a higher coefficient of friction and the outer peripheral side has a lower coefficient of friction. As a result, it is possible to increase a torque for a case of high load in a normal condition or high temperature condition. In addition, it is possible to increase the startup performance in a low temperature condition.

As the filler 15Ea with a high coefficient of friction and low lubricating ability, acrylic beads, silica, mica and the like may be used. As the filler 15E and 15Eb with a low coefficient of friction and high lubricating ability, 4-fluorinated resin, 2-sulfurated molybdenum and the like may be used, for example.

It may alternatively be possible that the driven surface 15C with regions of different coefficients of friction is realized through different aperture ratios of the pores 15D at the driven surface 15C, which are uniformly impregnated with the filler 15E. For example, an aperture ratio of the pores 15D is adjusted to be greater on the outer peripheral side than on the inner peripheral side. These pores 15D are impregnated with the filler 15E having a low coefficient of friction. In this manner, it is possible to cause the driven surface 15C of the movement member 15 to have a lower coefficient of friction in the region on the outer peripheral side than in the region on the inner peripheral side. In contrast, an aperture ratio of the pores 15D is adjusted greater on the inner peripheral side than on the outer peripheral side. These pores 15D are impregnated with the filler 15E having a high coefficient of friction. In this manner, it is possible to cause the driven surface 15C of the movement member 15 to have a lower coefficient of friction in the region on the outer peripheral side than in the region on the inner peripheral side.

When the movement member 15 is formed by injection forming of a resin material, as described above, the driven surface 15C having the pores 15D of different aperture ratios can be formed by adjusting forming conditions (temperature, injection pressure, injection speed and the like).

The present embodiment described above provides the following advantages.

The region on the outer peripheral side of the driven surface 15C of the movement member 15 has a low coefficient of friction and high lubricating ability. Accordingly, it is possible to decrease the friction in the region on the outer peripheral side of the driven surface 15C of the movement member 15, which is excessively in contact with the driving surface 12d in low temperature conditions. In this manner, it is possible to increase the startup performance of the ultrasonic motor 10 in low temperature conditions. In addition, it is possible to increase the friction in the region on the inner peripheral side of the driven surface 15C of the movement member 15, which is excessively in contact with the driving surface 12d in high temperature conditions. In this manner, it is possible to increase the torque performance of the ultrasonic motor 10 in high temperature conditions.

The ultrasonic motor 10 includes the movement member 15 provided with the driven surface 15C having the pores 15D, which are impregnated with the filler 15E. As a result, it is possible to appropriately determine the coefficient of friction of the driven surface 15C by the impregnation of the filler 15E.

Variant Examples

The present invention is not limited to the embodiments described above. Numerous modifications and improvements as illustrated below are possible and are encompassed by the technical scope of the present invention.

In the present embodiment, an example has been described, in which the coefficient of friction of the driven surface 15C is higher on the inner peripheral side and lower on the outer peripheral side. However, the present invention is not limited thereto. It may alternatively be possible that the coefficient of friction is lower on the inner peripheral side and higher on the outer peripheral side.

In such a case, it may be possible that only the region on the outer peripheral side of the driven surface 15C of the movement member 15 is impregnated with the filler 15E with a high coefficient of friction and low lubricating ability.

It may alternatively be possible that only the region on the inner peripheral side of the driven surface 15C of the movement member 15 is impregnated with the filler 15E with a low coefficient of friction and high lubricating ability.

Furthermore, it may be possible that the driven surface 15C is impregnated not only with the filler 15Ea with a low coefficient of friction on the inner peripheral side, but also with the filler 15Eb with a high coefficient of friction and low lubricating ability in a predetermined region on the outer peripheral side.

It may alternatively be possible that the aperture ratios of the pores 15D are configured to be different at the driven surface 15C and the pores 15D are uniformly impregnated with the filler 15E, as in the embodiment described above. For example, an aperture ratio of the pores 15D is adjusted to be greater on the inner peripheral side than on the outer peripheral side. These pores 15D are impregnated with the filler 15E having a low coefficient of friction. In this manner, it is possible to cause the driven surface 15C of the movement member 15 to have a lower coefficient of friction in the region on the inner peripheral side than in the region on the outer peripheral side.

In contrast, an aperture ratio of the pores 15D is adjusted greater on the outer peripheral side than on the inner peripheral side. These pores 15D are impregnated with the filler 15E having a high coefficient of friction. In this manner, it is possible to cause the driven surface 15C of the movement member 15 to have a higher coefficient of friction in the region on the outer peripheral side than in the region on the inner peripheral side.

In the present embodiment, an example of the porous driven surface 15C of the movement member 15 has been described, in which the pores 15D are impregnated with the filler 15E so as to change the coefficient of friction in a radial direction. However, the present embodiment is not limited thereto and the coefficient of friction of the contacting surface of the elastic body 12 may be alternatively changed in the radial direction.

In the present embodiment, the ultrasonic motor using vibration of an ultrasonic range is exemplified; however, the present invention is not limited thereto and may alternatively be applied to a vibration actuator using vibration not of an ultrasonic range.

The embodiments and variant examples may be used in suitable combinations, though detailed descriptions are not given here. The present invention is in no way limited by the embodiments described above.

What is claimed is:

1. A vibration actuator comprising:
an elastic member that generates oscillatory waves by an electromechanical conversion element; and
a relative movement member with which the elastic member is in contact so that the oscillatory waves cause the relative movement member to be driven to move with respect to the elastic member, wherein
of the elastic member and the relative movement member, at least one member is configured to have a plurality of spaces at one contacting face of the one member opposite to the other contacting face of the other member,
the spaces are filled with coefficient of friction adjusting substances so that a coefficient of friction of the one contacting face of the one member changes in a radial direction, and
the more outward a space is located in the radial direction, a coefficient of friction adjusting substance having the higher degree of changing the coefficient of friction is filled in the space.

2. A vibration actuator comprising:
an elastic member that generates oscillatory waves by an electromechanical conversion element; and
a relative movement member with which the elastic member is in contact so that the oscillatory waves cause the relative movement member to be driven to rotationally move with respect to the elastic member, wherein
of the elastic member and the relative movement member, at least one member is configured to have a plurality of spaces at one contacting face of the one member opposite to the other contacting face of the other member,
the spaces are filled with coefficient of friction adjusting substances so that a coefficient of friction of the one contacting face of the one member changes in a radial direction, and the more inward a space is located in the radial direction, a coefficient of friction adjusting substance having the higher degree of changing the coefficient of friction is filled in the space.

3. A vibration actuator comprising:

an elastic member that generates oscillatory waves by an electromechanical conversion element; and a relative movement member with which the elastic member is in contact so that the oscillatory waves cause the relative movement member to be driven to rotationally move with respect to the elastic member, wherein of the elastic member and the relative movement member, at least one member is configured to have a plurality of spaces at one contacting face of the one member opposite to the other contacting face of the other member, the spaces are filled with coefficient of friction adjusting substances so that a coefficient of friction of the one contacting face of the one member changes in a radial direction, and proportions of the spaces differ from each other depending on positions in the radial direction.

4. The vibration actuator according to claim 3, wherein the more outward a space is located in the radial direction, the greater a proportion of the space is.

5. The vibration actuator according to claim 3, wherein the more inward a space is located in the radial direction, the greater a proportion of the space is.

6. A lens barrel comprising the vibration actuator according to claim 1.

7. A camera comprising the vibration actuator according to claim 1.

8. A lens barrel comprising the vibration actuator according to claim 2.

9. A camera comprising the vibration actuator according to claim 2.

10. A lens barrel comprising the vibration actuator according to claim 3.

11. A camera comprising the vibration actuator according to claim 3.

* * * * *